United States Patent
Matsubara et al.

(10) Patent No.: US 7,822,613 B2
(45) Date of Patent: Oct. 26, 2010

(54) VEHICLE-MOUNTED CONTROL APPARATUS AND PROGRAM THAT CAUSES COMPUTER TO EXECUTE METHOD OF PROVIDING GUIDANCE ON THE OPERATION OF THE VEHICLE-MOUNTED CONTROL APPARATUS

(75) Inventors: Tsutomu Matsubara, Tokyo (JP); Masato Hirai, Tokyo (JP); Emiko Kido, Tokyo (JP); Fumitaka Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1263 days.

(21) Appl. No.: 10/497,695

(22) PCT Filed: Oct. 7, 2003

(86) PCT No.: PCT/JP03/12848

§ 371 (c)(1),
(2), (4) Date: Jun. 4, 2004

(87) PCT Pub. No.: WO2004/032113

PCT Pub. Date: Apr. 15, 2004

(65) Prior Publication Data

US 2005/0021341 A1 Jan. 27, 2005

(30) Foreign Application Priority Data

Oct. 7, 2002 (JP) ............................. 2002-293327

(51) Int. Cl.
*G10L 15/00* (2006.01)
*G10L 15/02* (2006.01)

(52) U.S. Cl. ...................... 704/275; 704/251; 704/231; 704/246; 704/271

(58) Field of Classification Search ................. 704/246, 704/271, 275, 231, 251
See application file for complete search history.

(56) References Cited

U.S. PATENT DOCUMENTS 4,672,668 A 6/1987 Kitazume et al.

(Continued)

FOREIGN PATENT DOCUMENTS

JP 62-232692 A 10/1987

(Continued)

OTHER PUBLICATIONS

Riccardi et al. "Active and unsupervised learning of automatic speech recognition", Eigth european Conference on speech, 2003, pp. 1-4.*

(Continued)

*Primary Examiner*—David R Hudspeth
*Assistant Examiner*—Abdelali Serrou
(74) *Attorney, Agent, or Firm*—Birch, Stewart, Kolasch & Birch, LLP

(57) ABSTRACT

In a vehicle-mounted control apparatus, a control unit 2 displays guidance on an operation of the vehicle-mounted control apparatus by voice input on a display device 6, and makes the user get training so that the user can master the techniques for operating the vehicle-mounted control apparatus (in step ST4). At this time, by using a voice which the user tries to input in order to master the techniques for operating the vehicle-mounted control apparatus, the voice recognition unit 5 learns the features of the user's voice in the background, and computes recognition parameters. Thereby, the user can know how to operate the vehicle-mounted control apparatus and can also register the features of the voice in the vehicle-mounted control apparatus.

9 Claims, 6 Drawing Sheets

U.S. PATENT DOCUMENTS

| | | | |
|---|---|---|---|
| 4,827,520 A | | 5/1989 | Zeinstra |
| 5,444,673 A | * | 8/1995 | Mathurin ..................... 368/63 |
| 5,710,864 A | * | 1/1998 | Juang et al. ................. 704/238 |
| 5,799,279 A | * | 8/1998 | Gould et al. ................. 704/275 |
| 5,850,627 A | * | 12/1998 | Gould et al. ................. 704/231 |
| 5,864,338 A | * | 1/1999 | Nestor et al. ................. 715/201 |
| 5,922,042 A | * | 7/1999 | Sekine et al. ................. 701/210 |
| 5,970,457 A | * | 10/1999 | Brant et al. ................. 704/275 |
| 6,006,185 A | * | 12/1999 | Immarco .................... 704/251 |
| 6,411,926 B1 | * | 6/2002 | Chang ........................ 704/221 |
| 6,535,850 B1 | * | 3/2003 | Bayya ........................ 704/239 |
| 6,549,847 B2 | * | 4/2003 | Ikeuchi et al. ............... 701/208 |
| 6,671,669 B1 | * | 12/2003 | Garudadri et al. ........... 704/255 |
| 6,748,301 B1 | * | 6/2004 | Ryu .............................. 701/1 |
| 6,801,222 B1 | * | 10/2004 | Dunham et al. ............. 715/714 |
| 7,043,699 B2 | * | 5/2006 | Obradovich ................. 715/790 |
| 7,231,352 B2 | * | 6/2007 | Kustner et al. .............. 704/256 |
| 7,292,918 B2 | * | 11/2007 | Silvester ....................... 701/29 |
| 7,318,029 B2 | * | 1/2008 | Coyle et al. ................. 704/231 |
| 2002/0013701 A1 | * | 1/2002 | Oliver et al. ................. 704/231 |
| 2002/0049590 A1 | * | 4/2002 | Yoshino et al. .............. 704/241 |
| 2002/0178004 A1 | * | 11/2002 | Chang et al. ................. 704/246 |

FOREIGN PATENT DOCUMENTS

| | | |
|---|---|---|
| JP | 1-285998 A | 11/1989 |
| JP | 4-88399 A | 3/1992 |
| JP | 4-310045 A | 11/1992 |
| JP | 10-227646 A | 8/1998 |
| JP | 11-194790 A | 7/1999 |
| JP | 11-242494 A | 9/1999 |
| JP | 2000-009480 A | 1/2000 |
| JP | 2000-097719 A | 4/2000 |
| JP | 2000-352992 A | 12/2000 |
| JP | 2001-194166 A | 7/2001 |
| WO | WO-87/07460 A1 | 12/1987 |
| WO | WO 02/21509 A1 | 3/2002 |

OTHER PUBLICATIONS

Wessel et al. "Confidence measures for large vocabulary continuous speech recognition" Speech and audio Processing, IEEE Transactions on, Mar. 2001, vol. 9, Issue 3, pp. 288-298.*

"Easy Navigate Task List by Voice," *IBM Technical Disclosure Bulletin*, vol. 40, No. 05, May 1997, p. 81.

* cited by examiner

FIG. 4
INITIAL SCREEN
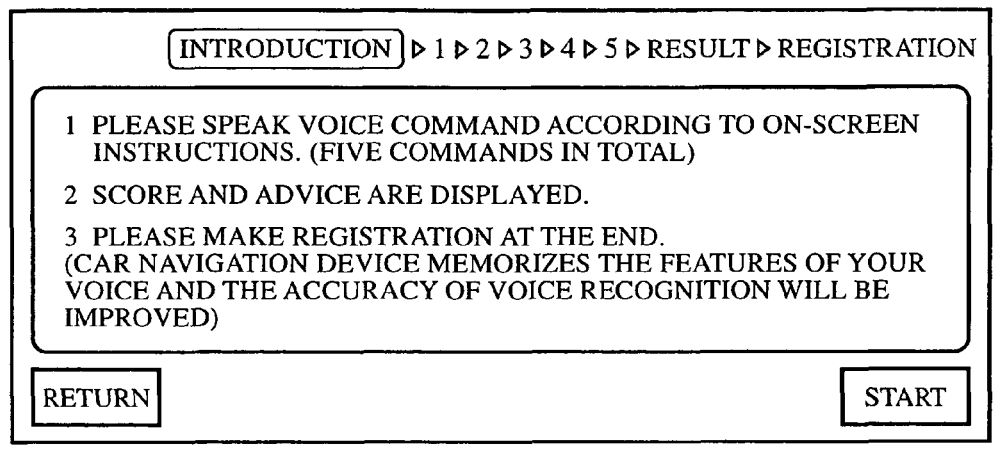
(a)
START BUTTON IS PUSHED DOWN
OPERATING GUIDE SCREEN
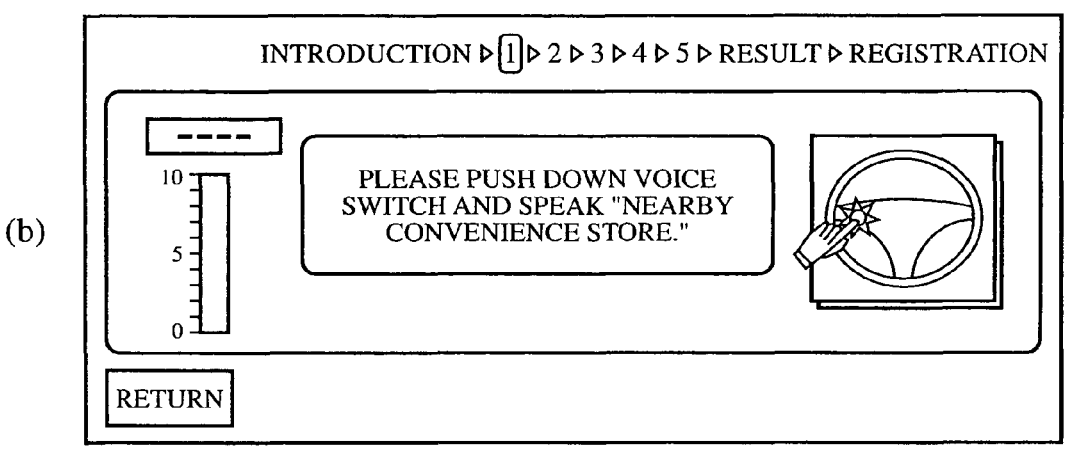
(b)
 VOICE SWITCH + SPOKEN
ADVICE DISPLAY SCREEN
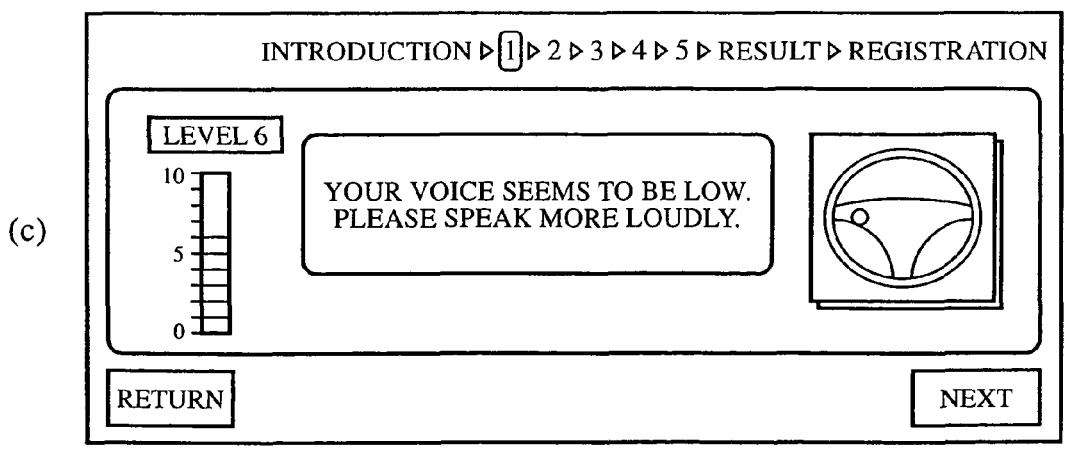
(c)

FIG.5

RESULT DISPLAY SCREEN

INTRODUCTION ▷ 1 ▷ 2 ▷ 3 ▷ 4 ▷ 5 ▷ [RESULT] ▷ REGISTRATION

● RECOGNITION LEVEL     ■ SUMMARY OF ADVICE
                       1 PLEASE SPEAK MORE LOUDLY.
                       2 PROPERLY RECOGNIZED.
                       3 PLEASE SPEAK MORE SLOWLY.
                       4 PLEASE SPEAK ONLY COMMAND.
                       5 PLEASE SPEAK MORE QUICKLY.

[RETRY]  [REGISTRATION]

FIG.7

REGISTRATION SCREEN

INTRODUCTION ▷ 1 ▷ 2 ▷ 3 ▷ 4 ▷ 5 ▷ RESULT ▷ [REGISTRATION]

■ PLEASE CHOOSE LOCATION FOR REGISTRATION OF YOUR VOICE. (IF RE-REGISTER YOUR VOICE AT LOCATION WHERE VOICE HAS BEEN ALREADY REGISTERED, THE ACCURACY OF VOICE RECOGNITION WILL BE IMPROVED)

| MR. OR MS. A 01' 07/26 | MR. OR MS. B --' --/-- | MR. OR MS. C --' --/-- | MR. OR MS. D --' --/-- | MR. OR MS. E --' --/-- |
|---|---|---|---|---|
| RE-REGISTRATION | REGISTRATION | REGISTRATION | REGISTRATION | REGISTRATION |

[TERMINATION]                                           [COMPLETION]

FIG.6

<ADVICE LIST>

| NUMBER | CATEGORY | CONTENTS OF ADVICE | DETECTION METHOD |
|---|---|---|---|
| (1) | ATTACHED WORDS | DID YOU START SPEAKING COMMAND AFTER SAYING "LET ME SEE" OR THE LIKE? PLEASE SPEAK ONLY COMMAND. | REGISTER VOCABULARIES SUCH AS "LET ME SEE", ETC. AS A DICTIONARY |
| (2) | TOO LOW SOUND LEVEL | YOUR VOICE SEEMS TO BE LOW. PLEASE SPEAK MORE LOUDLY. | DETERMINE WHETHER Max Pow IS EQUAL TO OR LESS THAN -30dB |
| (3) | TOO HIGH SOUND LEVEL | YOUR VOICE SEEMS TO BE HIGH. PLEASE SPEAK IN A LOWER VOICE. | DETERMINE WHETHER Max Pow IS EQUAL TO OR GREATER THAN 0dB |
| (4) | TOO FAST SPEAKING | YOU SEEM TO BE SPEAKING SOMEWHAT FAST. PLEASE SPEAK MORE SLOWLY. | DETERMINE WHETHER SPEAKING TIME IS TOO SHORT COMPARED WITH WORD LENGTH |
| (5) | TOO SLOW SPEAKING | YOU SEEM TO BE SPEAKING SLOWLY. PLEASE SPEAK MORE QUICKLY. | DETERMINE WHETHER SPEAKING TIME IS TOO LONG COMPARED WITH WORD LENGTH |
| (6) | TOO EARLY TIMING | YOU SEEM TO HAVE STARTED SPEAKING AT AN EARLIER TIMING. AFTER A BEEPING SOUND, PLEASE MAKE A BRIEF PAUSE AND SPEAK COMMAND. | DETERMINE WHETHER VOICE INPUT STARTS FROM THE BEGINNING |
| (7) | TOO LATER TIMING | YOU SEEM TO HAVE STARTED SPEAKING AT A LATER TIMING. PLEASE SPEAK COMMAND AFTER A BEEPING SOUND. | DETERMINE WHETHER A TIMEOUT OCCURS |
| (8) | UNCLEAR WORDS | CANNOT CATCH YOUR VOICE WELL. PLEASE OPEN YOUR MOUTH WIDE AND SPEAK COMMAND CLEARLY. | DETERMINE WHETHER SCORE IS LESS THAN 600 |
| (9) | HIGH SCORE | PROPERLY RECOGNIZED | DETERMINE WHETHER SCORE IS EQUAL TO OR GREATER THAN 850 |
| (10) | INVALID COMMAND | DID YOU SPEAK ANYTHING OTHER THAN COMMAND? PLEASE SPEAK ONLY COMMAND. | ALSO REGISTER TEXT INCLUDING VOCABULARIES AT THE END THEREOF IN ADDITION TO COMMAND |

VEHICLE-MOUNTED CONTROL APPARATUS AND PROGRAM THAT CAUSES COMPUTER TO EXECUTE METHOD OF PROVIDING GUIDANCE ON THE OPERATION OF THE VEHICLE-MOUNTED CONTROL APPARATUS

FIELD OF THE INVENTION

The present invention relates to a vehicle-mounted control apparatus that performs control operations according to a voice command, and a program that causes a computer to execute a method of providing guidance on the operation of the vehicle-mounted control apparatus.

BACKGROUND OF THE INVENTION

Conventionally, there has been provided a car navigation apparatus that makes a conversational explanation of guidance on the operation of the car navigation apparatus by using a screen and by voice so as to help users to make keystrokes to input a command to the car navigation apparatus (for example, see Japanese patent application publication No. 2000-97719). There has been also provided a car navigation apparatus that can directly receive a voice command in a command execution mode without displaying an operating guide, as a method of making it possible for the user to input a command in a shorter time by accepting input of conversational commands.

However, when inputting a command by voice, the user may be unable to correctly input the command into the car navigation apparatus unless the user is accustomed to operating the prior art car navigation apparatus. In some cases, the user may not activate an unfamiliar audio input function. In addition, the user has to take the trouble to carry out a registration process in order to make the prior art car navigation apparatus learn the user's voice, and there is a possibility that the user has not carried out such a registration process.

It is therefore an object of the present invention is to provide an easy-to-operate vehicle-mounted control apparatus that requires users to perform only a small amount of operations, and a program that causes a computer to execute a method of providing guidance on the operation of the vehicle-mounted control apparatus.

DISCLOSURE OF THE INVENTION

In accordance with the present invention, there is provided a vehicle-mounted control apparatus including a voice recognition means for recognizing a voice command input by a user based on the user's voice, and a control means having a command execution mode in which the control means executes the voice command recognized by the voice recognition means, and a training mode in which the control means provides guidance on an operation of the vehicle-mounted control apparatus to the user so as to make the user get training for operating the vehicle-mounted control apparatus, the control means displaying operating guidance on the operation of the vehicle-mounted control apparatus using a voice command in the training mode, and the voice recognition means acquiring a voice for training which the user produces according to the voice command in the training mode, and learning features of the user's voice based on the acquired voice for training.

When the user wants to know how to operate the vehicle-mounted control apparatus, the vehicle-mounted control apparatus can provide the user an opportunity to get training for operating the vehicle-mounted control apparatus so that the user can master the operation of the vehicle-mounted control apparatus effectively. Furthermore, since the vehicle-mounted control apparatus can also finish learning recognition parameters for recognition of the user's voice by carrying out the training processing for making it possible for the user to master the operation of the vehicle-mounted control apparatus, the present invention offers an advantage of being able to improve the accuracy of voice recognition without forcing the user to independently input a voice in order to make the vehicle-mounted control apparatus learn the user's voice, thereby saving the user some work when performing control according to a voice command.

BRIEF DESCRIPTION OF THE FIGURES

FIG. 4 is a diagram showing the contents of display by a display device in accordance with the embodiment of the present invention;

FIG. 5 is a diagram showing the contents of display by the display device in accordance with the embodiment of the present invention;

FIG. 6 is a diagram showing an example of advice in the embodiment of the present invention; and FIG. 7 is a diagram showing the contents of display by the display device in accordance with the embodiment of the present invention.

PREFERRED EMBODIMENT OF THE INVENTION

Hereafter, in order to explain this invention in greater detail, the preferred embodiment of the present invention will be described with reference to the accompanying drawings.
Embodiment 1.

Figure 1:
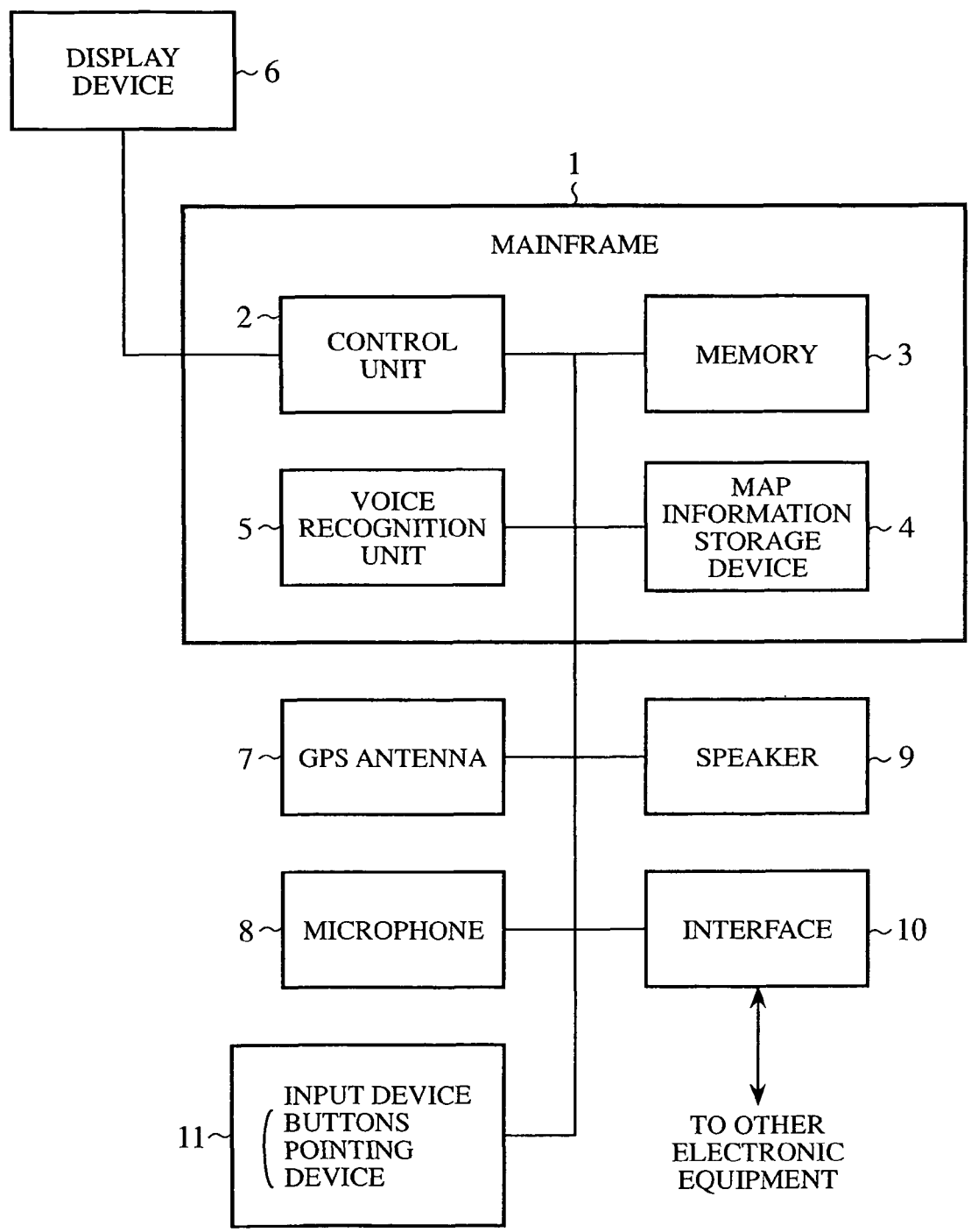
FIG. 1 is a functional block diagram showing a navigation apparatus in accordance with an embodiment of the present invention.

FIG. 1 is a vehicle-mounted control apparatus in accordance with this embodiment 1, and shows a car navigation apparatus as an example of the vehicle-mounted control apparatus.

In FIG. 1, a mainframe 1 has a control unit 2 that consists of a microprocessor or the like, a memory 3 connected to the control unit 2, for storing programs and various data, a map information storage device 4 also connected to the control unit 2, for storing digitized data about maps, and a voice recognition unit 5 for recognizing spoken words from a voice signal input thereto from a microphone 8. The control unit 2 has a function of controlling a display device 6 connected to the mainframe 1 so as to display route information and road information required for navigation on the display device 6. Although a liquid crystal display is generally used as the display device 6, any type of display can be used as the display device 6, and the display device 6 can be integral with the mainframe of the car navigation apparatus or can be embedded in a part of an indoor surface of a vehicle so that it is integral with the vehicle.

In order to carry out-navigation, the control unit 2 calculates the location of the vehicle in which the car navigation apparatus is mounted from signals from two or more satellites, which are received by a GPS (Global Positioning System) antenna 7, according to a calculation method using a well-known technique. The microphone 8 converts the user's voice into an electric signal and delivers it to the voice recognition unit 5, and a speaker 9 outputs a sound, such as a voice, a sound effect, or music, under control of the control unit 2.

An interface 10 has a function of passing on a signal indicating an operating state of each electronic equipment disposed in the vehicle and a control signal for controlling each electronic equipment between the control unit 2 and a control device for controlling an air conditioner, a headlight, and sensors for detecting the on/off states of a wiper and the headlight, which are not shown in the figure.

An input device 11 is a device for detecting a command input thereto from the user and outputs a signal corresponding to this command to the control unit 2. As this input device 11, one of various input devices for converting a command input thereto from the user into a signal, such as one or more buttons, a tablet, a touch sensor mounted on the display device 6, a joystick, and a lever disposed in the vehicle, can be used.

This vehicle-mounted control apparatus has two modes: a command execution mode and a training mode.

The command execution mode is the one in which the car navigation apparatus performs normal operations, and, when the users inputs a command by voice in the command execution mode, the voice recognition unit 5 recognizes the voice command input by the user and the control unit 2 performs processing-corresponding to the voice command. In this command execution mode, the car navigation apparatus can perform control of various pieces of vehicle-mounted electronic equipment, such as setting of a destination for navigation and start of route guidance, control of the air conditioner, such as adjustment of the volume of air, audio control, and control of electronic equipment intended for transmission and reception of electronic mails and Internet ITS (Intelligent Transport Systems), and control of electronic equipment disposed outside the vehicle by way of the Internet, for example.

On the other hand, the training mode is the one in which the car navigation apparatus provides guidance for performing a voice input to the user so that the user can get training for performing a voice input and can learn how to use the car navigation apparatus to make a voice input while trying various kinds of speaking (syntax, volume of voice, speed, etc.) at the time of making a voice input. At this time, in contrast to the case of the command execution mode in which the user is allowed to input a voice command on the user's own initiative, in the case of the training mode the user performs a voice input according to an instruction from the vehicle-mounted control apparatus. For example, the vehicle-mounted control unit shows examples of the voice command so that the user gets training for performing a voice input by using these examples. The user can perform switching between the command execution mode and the training mode by pushing down a selection button or selecting a corresponding item in a menu displayed on the display device, for example.

Figure 2:
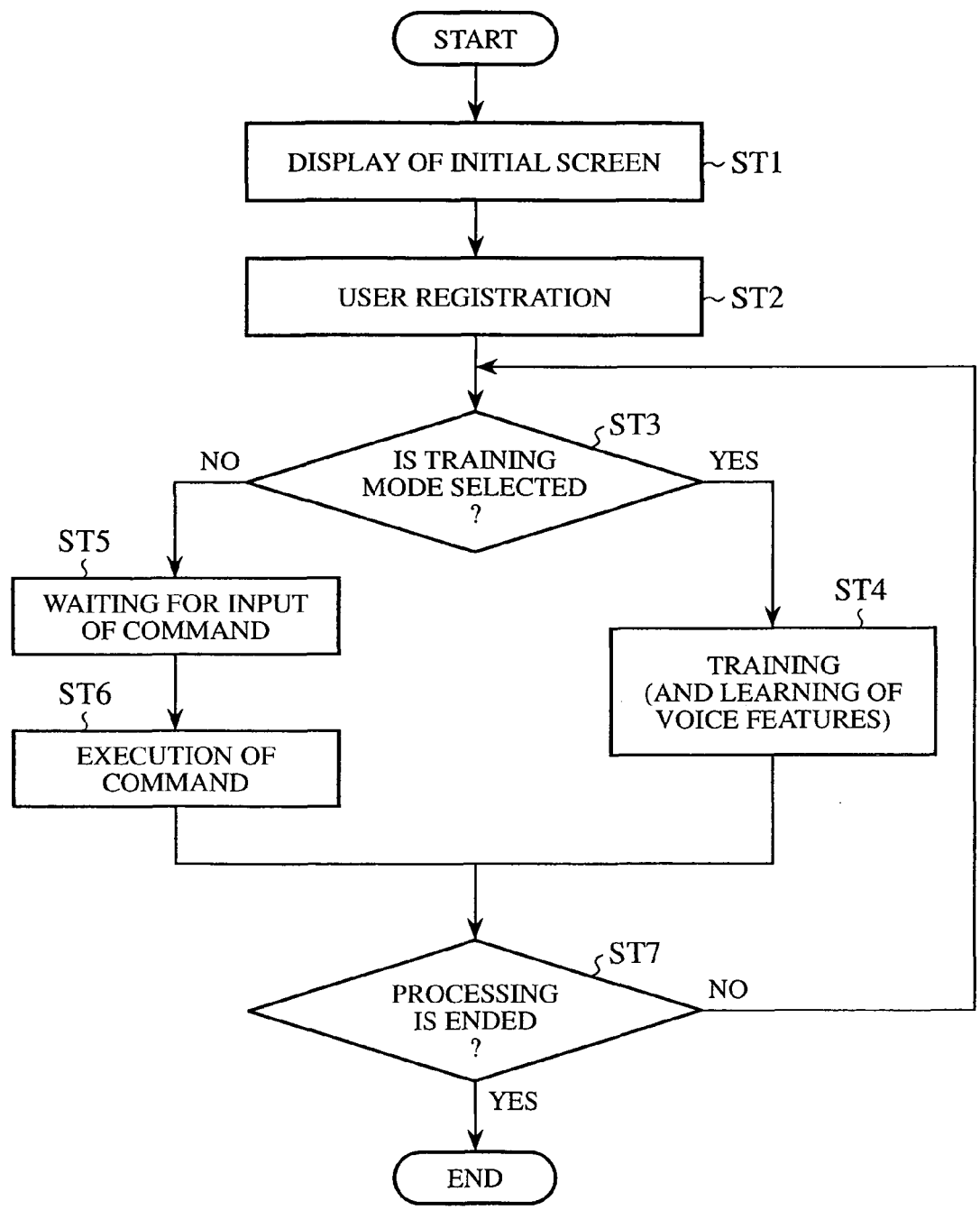
FIG. 2 is a flow chart showing the whole of processing performed by the vehicle-mounted control unit in accordance with the embodiment of the present invention.

FIG. 2 is a flow chart showing the operation of the control unit 2 which can select either the command execution mode or the training mode according to the user's instruction. First, when the vehicle-mounted control apparatus is started up, the vehicle-mounted control apparatus displays an initial screen at the time of startup (in step ST1). The control unit 2 performs a display of "Please select user" in the initial screen, and displays a list of two or more user names that are pre-registered in the memory 2. The user who looks at this display can select one user name from the list. When detecting a signal indicating the selected user name which is output from the input device 11, the control unit 2 specifies the corresponding user based on this signal (in step ST2).

The control unit 2 further detects an input signal from the input device 11, and checks to see whether the input signal indicates an instruction for placing the control unit in the training mode (in step ST3). When the user selects the training mode, the control unit 2 performs processing associated with the training mode of step ST4 (the processing associated with the training mode will be explained with reference to FIG. 3). On the other hand, when the training mode is not selected by the user, the control unit 2 performs processing associated with the command execution mode in steps ST5 and ST6. In the command execution mode, the control unit 2 waits for an input signal from the input device 11 and/or an input of a voice command from the microphone 8 first (in step ST5).

When a voice is then input into the microphone 8 by the user, the voice recognition unit 5 recognizes the input voice. At this time, the voice recognition unit 5 reads a recognition parameter set for the user specified in step ST2 from the memory 2, and recognizes the voice by using this recognition parameter. The control unit 2 then specifies which one of the two or more types of commands has been input based on a result of the voice recognition done by the voice recognition unit 5. The control unit 2 performs processing associated with the specified command (in step ST6).

Finally, the control unit 2 determines whether the user has performed an operation of interrupting the processing by the vehicle-mounted control apparatus (for example, an operation of turning off the power) based on an electric signal or the like from an electronic power supply key by way of the input device 11 or the interface (in step ST7). When the user has not performed any operation of interrupting the processing by the vehicle-mounted control apparatus yet, the control unit 2 repeats the processing from step ST3. On the other hand, when the user has performed an operation of interrupting the processing by the vehicle-mounted control apparatus, the control unit 2 ends the processing.

Figure 3:
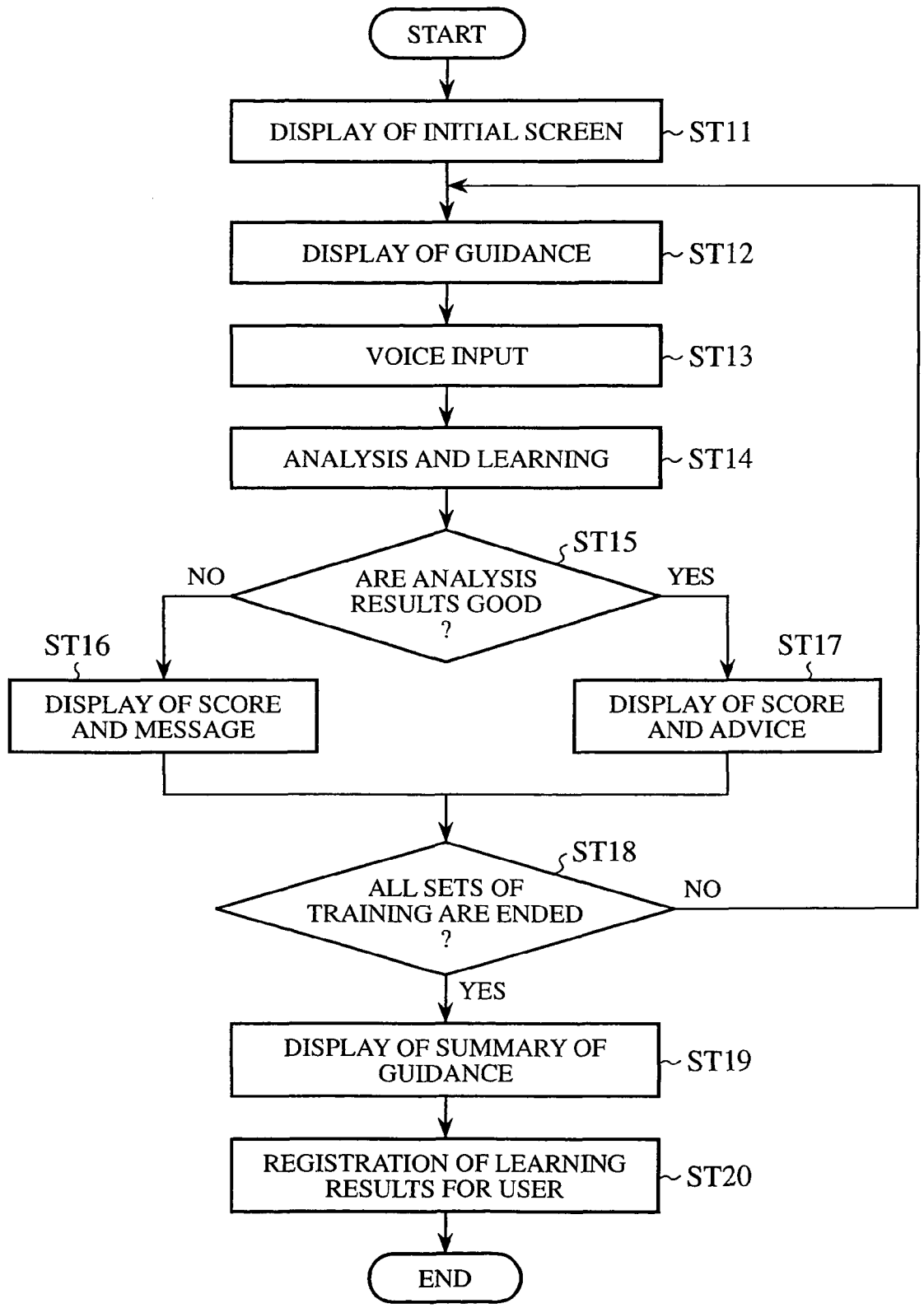
FIG. 3 is a flow chart processing in a training mode in the embodiment of the present invention.

Next, the operation of the vehicle-mounted control unit that is placed in the training mode will be explained. FIG. 3 is a flow chart of a corresponding program which the control unit 2 executes, and shows a process of step ST4 of FIG. 2.

When the user selects the training mode, the control unit 2 displays an initial screen as shown in FIG. 4(*a*) on the display device 6 (in step ST11). This initial screen is provided for giving an explanation of a flow of the whole of the processing associated with the training mode to the user.

Next, when the control unit 2 detects a command input thereto by way of the input device 11 and the input command indicates "start", the control unit 2 displays a screen showing an operating guide, as shown in FIG. 4(*b*) (in step ST12). In the display of this operating guide, the control unit 2 reads an example of the voice command from the memory 3, and displays it on the display device 6. At this time, as shown in FIG. 4(*b*), the control unit 2 can also give an explanation of entire operations including an operation of the input device 11 (for example, pushing down of a voice button at the time of a voice input).

When the user starts producing a voice according to the on-screen operating guide, the control unit 2 records the user's voice received by the microphone. 8 in the memory 2 (in step ST13). For example, when an explanation of "Push down voice switch and speak "Nearby convenience store"" is displayed as the operating guide, the user can push down the voice button disposed in a handle grip or the like and then start producing a voice. The control unit 2 then starts recording a voice signal received by the microphone 8 when the voice switch is pushed down.

The control unit 2 then instructs the voice recognition unit 5 to perform analyses on the voice recorded in step ST13 and to learn the features of the recorded voice (in step ST14). According to a well-known voice recognition algorithm, the voice recognition unit 5 analyzes the features of the recorded voice and records an analysis result in the memory 2. For example, the voice recognition unit 5 compares a pattern of the input voice with reference voice patterns stored in the memory 2, and performs analyses on each of a plurality of features, such as the sound level of the input voice, the speaking speed, the speaking timing, the likelihood of the input voice, or whether unnecessary spoken words (referred to as attached words from here on) are contained in the input voice pattern, and then outputs results of the analyses.

By comparing the user's voice pattern with the reference voice patterns, the voice recognition unit 5 performs analyses on the features of the user's voice pattern and learns to make a correction to parameters for the voice recognition according to the features of the user's voice pattern. The vehicle-mounted control apparatus can use well-known various techniques for the voice recognition algorithm and the method of learning parameters for the voice recognition. For example, the voice recognition unit 5 can process step ST14 by executing a voice recognition method using a hidden Markov model, which is disclosed by Japanese patent application publication No. 11-242494, and a method of learning user-dependent parameters.

Then, the control unit 2 determines whether the input voice has a good quality based on the analysis results obtained in step ST14 (in step ST15). The control unit 2 can determine whether the input voice has a good quality by using any one of the above-mentioned voice parameters indicating ease of carrying out voice recognition. For example, when one of the plurality of features, i.e., the sound level of the input voice, the speaking speed, the speaking timing, the likelihood of the input voice, or whether attached words are contained in the input voice pattern shows "bad", the control unit 2 determines that a final analysis result is "bad". On the other hand, when all the analysis results show "good", the control unit 2 determines that the final analysis result is "good."

When, in step ST15, determining that all the analysis results show good, the control unit 2 displays a score dependent upon the likelihood of the input voice and a message of "Properly recognized your voice" on the display device 6.

On the other hand, when, in step ST15, determining that any one of all the analysis results shows "bad", the control unit 2 displays a text associated with the analysis results on the display device 6 as advice information (as for the text, refer to a list of pieces of advice shown in FIG. 6). An example of the text displayed on the display device is shown in FIG. 4(c). The control unit 2 can also display a score indicating the likelihood of the input voice on the display device 6. At this time, the score can be data corresponding to this score, the data being abstracted from the score which the control unit 2 uses internally so that the user can easily understand the score. For example, when the internally-used score falls within a range of 0 to 1000 points, the control unit 2 divides this range of the internally-used score into ten equal parts of 100 points, converts them into zero-th to 10-th levels, and then displays a corresponding level on the display device 6 as the score.

The control unit 2 then determines whether all the entries for training which are prepared in advance have been ended (in step ST18). When the training processing for all the entries for training is not completed, the control unit 2 returns to step ST12 in which the control unit repeats the training processing for a different example of the voice command.

On the other hand, when the training processing for all the entries for training is completed, the control unit 2 displays entire analysis results and pieces of advice based on the analysis results, as shown in FIG. 5 (in step ST19). FIG. 6 shows categories of the results of analyses on the voice input and plural pieces of corresponding textual advice displayed in step ST18.

For example, when repeatedly carrying out steps ST12 to ST18 so as to make the user get five sets of training for a total of five different voice commands, the control unit 2 collectively displays five scores and five pieces of advice which respectively correspond to the first to fifth sets of training, as shown in FIG. 5. For example, when the sound level of the input voice which is a result of the first set of training is −30 dB or less, the control unit 2 displays "1 Please speak more loudly." on the display device 6. Although the contents of the corresponding textual advice include a text showing the analysis result (for example, "The sound level is low", and a piece of textual advice indicating remedial measures taken against the voice input (for example, "Please speak more loudly."), the control unit 2 can display only the textual advice in order to simplify the text displayed in step ST17, as shown in FIG. 5.

When the screen display of FIG. 5 is displayed and the user selects an icon of "RETRY" using the input device 11, the control unit 2 repeats the training processing from step ST11.

Finally, when the user selects an icon of "REGISTRATION", the control unit 2 stores the parameters learned in step ST14 in the memory 2 as the parameters intended for the current user (in step ST20). At this time, the control unit 2 can separately store the parameters learned for the user in a memory location on a user-by-user basis. First, the control unit 2 displays an inquiry screen in which the control unit 2 inquires of the user about which memory location is selected from among a plurality of memory locations separately provided on a user-by-user basis for storing the parameters learned for the current user on the display device 6, as shown in FIG. 7. The selection by the user is input into the input device 11, and the control unit 2 specifies a corresponding memory location based on the input information from the input device 11 and stores the learned parameters in the specified memory location. When parameters for the current user are already registered, the control unit 2 combines the already registered parameters and the parameters currently learned for the current user into parameters and stores the combined parameters in the memory. Any type of method of combining the already registered parameters and the parameters currently learned for the current user can be used as long as this combining method improves the accuracy of voice recognition. For example, a method of averaging the existing parameters and the currently-learned parameters, or a method of adding them after assigning weights to the existing parameters and the currently-learned parameters according to the significance of the newest learned parameters can be used.

Details of Voice Analysis

For example, the control unit determines whether the input voice has a good quality according to the following methods (see FIG. 6 as for detection methods).

(1) The Presence or Absence of an Attached Word at the Head of the Input Sentence The voice recognition unit 5 compares the input sentence or voice with reference patterns respectively associated with attached words, which are stored in the memory 2, and, when the input voice includes a pattern which agrees with an attached word at the head thereof, outputs an analysis result indicating "bad". In contrast, when the input voice includes no pattern which agrees with any attached word at the head thereof, the voice recognition unit 5 outputs an analysis result indicating "good".

(2) Whether the Sound Level is High or Low

The voice recognition unit 5 determines whether the sound level of the input voice falls within a predetermined range, and, when determining that the sound level of the input voice doesn't fall within the predetermined range, outputs an analysis result indicating "bad". In contrast, when determining that the sound level of the input voice falls within the predetermined range, the voice recognition unit 5 outputs an analysis result indicating "good". For example, when a maximum sound level that can be detected by the microphone 8 is 0 dB, the predetermined range of the sound level can be set to a range from −30 dB to less than 0 dB.

(3) Whether the Speaking Time is Long or Short

The voice recognition unit 5 measures the time length of the input voice, compares this time length with the time length of the corresponding reference pattern, and, when the difference between them falls within a predetermined range, determines that the input voice has a good quality.

The predetermined range can be set to an arbitrary value. For example, the predetermined range can be set to a range from −25% to +25% of the time length of the reference pattern.

(4) The Speaking Timing

The voice recognition unit 5 determines whether the speaking timing of the input voice falls within a predetermined timing range. When determining that the speaking timing of the input voice falls within the predetermined timing range, the voice recognition unit 5 outputs an analysis result indicating "good". In contrast, when determining that the speaking timing of the input voice doesn't fall within the predetermined timing range, the voice recognition unit 5 outputs an analysis result indicating "bad". For example, when the user's voice has been input from the beginning of a time period during which the microphone 8 can receive the user's voice, the voice recognition unit 5 outputs an analysis result indicating "bad". Also, when the input voice has been produced over a period of time that exceeds a maximum input time period set for the voice command, or when the voice input has been detected at the last of the above-mentioned time period which the microphone 8 can receive the user's voice, the voice recognition unit 5 outputs an analysis result indicating "bad". In cases other than those cases, the voice recognition unit 5 outputs an analysis result indicating "good".

(5) The Likelihood of the Pattern

The voice recognition unit 5 compares the input voice pattern with the corresponding reference pattern stored in the memory 2 so as to detect the likelihood of the input voice pattern. When determining that the likelihood of the input voice pattern is equal to or greater than a predetermined threshold, the voice recognition unit 5 outputs an analysis result indicating "good". In contrast, when determining that the likelihood of the input voice pattern is less than the predetermined threshold, the voice recognition unit 5 outputs an analysis result indicating "bad". The likelihood is defined by a Euclidean distance between the input voice pattern and the corresponding reference pattern. At this time, the voice recognition unit 5 computes a score based on the likelihood of the input voice pattern. For example, the voice recognition unit 5 computes the score as a function of the likelihood of the input voice pattern in such a manner that the score varies in proportion to the likelihood of the input voice pattern, assuming that the score becomes 1000 when the likelihood theoretically has the highest value and the score becomes 0 when the likelihood can be assumed to practically have the lowest value. Although the threshold can be set to an arbitrary value, the threshold can be set to 600 or more, for example.

(6) The Presence or Absence of an Attached Word at the End of the Input Sentence The voice recognition unit 5 determines whether the input voice includes a pattern which agrees with an attached word at the end thereof, as in the case of the detection (1) of an attached word at the head of the input sentence. When detecting an attached word at the end of the input voice, the voice recognition unit 5 outputs an analysis result indicating "bad". In contrast, when detecting no attached word at the end of the input voice, the voice recognition unit 5 outputs an analysis result indicating "good".

Details of Examples of the Command

In the training mode, as previously explained with reference to steps ST12 and ST13 of FIG. 3, the user is allowed to get training for two or more different commands. The structure of each example of the command will be explained hereafter. Examples of the command are stored in the memory 2. For example, the control unit 2 can use five examples of the command as follows:

(a) Searching for nearby facilities
"Nearby convenience stores"
(b) Searching for address
"Minami-Aoyama, Minato-ku, Tokyo"
(c) Searching for facilities
"TOKYO DOME in Tokyo"
(d) Setting of Destination
"I'm going to this destination"
(e) Control instructions other than root setting
"Two Screens"

The above sentences (a) to (e) include commands which comply with different syntaxes, respectively, and the voice recognition unit 5 can learn the plurality of voices which the user produce according to the different syntaxes, respectively. Therefore, as compared with a case where the voice recognition unit 5 learns sentences which the user speaks according to a monotonous syntax, such as "Nearby convenience stores" and "Nearby gas stations", the voice recognition unit 5 can perform the learning processing with a higher degree of recognition accuracy.

In addition, the above sentences (a) to (e) include words which differ from one another in their parts of speech. For example, the above sentences (a) to (e) include nouns and numerals, and therefore the voice recognition unit 5 can learn speaker-dependent recognition parameters for not only nouns, such as the names of places, but also the pronunciations of numeric characters. Therefore, the present invention can prevent improvements in the recognition accuracy provided by the learning processing from being produced only for nouns such as the names of places.

Although the above description is directed to the car navigation apparatus, the vehicle-mounted control apparatus in accordance with the present invention is not limited to the car navigation apparatus. For example, as long as the vehicle-mounted control apparatus controls either the vehicle or electronic equipment disposed outside the vehicle according to the user's voice, the vehicle-mounted control apparatus can be any type of electronic equipment. For example, the vehicle-mounted control apparatus can be vehicle-mounted electronic equipment such as a control apparatus for controlling an air conditioner, or a control apparatus for controlling audio equipment. As an alternative, the vehicle-mounted control apparatus can be a control apparatus for controlling electronic equipment disposed outside the vehicle by way of a transmitter connected to the interface 10. The electronic equipment disposed outside the vehicle can be any type of equipment, e.g., electronic equipment connected to the vehicle-mounted control apparatus by way of a communication line, such as an air conditioner intended for home use or business use, a house security system, a home server, another electric appliance, a payment system disposed in a dealer or distributor, such as a fast food shop or a gas station, or a gate disposed at the entrance of a parking lot.

Although the voice recognition unit 5 is constructed of an LSI intended for voice recognition in the control apparatus as shown in FIG. 1, the voice recognition unit is not limited to the special-purpose circuitry. A program for voice recognition stored in the memory 2 can be alternatively used as the voice recognition unit. In this case, the voice recognition program is executed by either the control unit 2 or an independent processor chiefly used for voice recognition.

In accordance with the above-mentioned embodiment, the voice recognition unit 5 conducts a speech analysis as preprocessing and the control unit 2 performs a process of displaying advice using results of the speech analysis. As an alternative, the control unit 2 can also perform processing other than the process of acquiring the likelihood of the input voice pattern.

In addition, in accordance with the above-mentioned embodiment, although recognition parameters are registered for each of two or more users, it is not necessary to separately store recognition parameters, which are registered in the training mode, on a user-by-user basis when only a specific user uses the vehicle-mounted control apparatus. When only a specific user uses the vehicle-mounted control apparatus, the user registration process of step ST2 in FIG. 2 becomes unnecessary.

A volatile memory or/and a nonvolatile memory can be used as the memory 2. A storage unit, such as a hard disk or a DVD-RAM, can be used as the storage means.

The above-mentioned training mode is very useful because in this mode the vehicle-mounted control apparatus outputs advice from the results of analysis performed on the voice for training so that the user can amend the method of operating the vehicle-mounted control apparatus. Therefore, the training mode can be also used as a training mode without the above-mentioned function of learning recognition parameters.

INDUSTRIAL APPLICABILITY

As mentioned above, the vehicle-mounted control apparatus in accordance with the present invention is suitable for saving users some work when performing control according to a voice command.

The invention claimed is:

1. A vehicle-mounted control apparatus comprising:
a voice recognition means for recognizing a voice command input by a user based on the user's voice; and
a control means having a command execution mode in which said control means executes the voice command recognized by said voice recognition means, and a training mode in which said control means provides guidance on an operation of said vehicle-mounted control apparatus to the user so as to make the user get training for operating said vehicle-mounted control apparatus, said control means displaying operating guidance on the operation of said vehicle-mounted control apparatus using a voice command in said training mode, and said voice recognition means acquiring a voice for training which the user produces according to said voice command in said training mode, and learning features of the user's voice based on the acquired voice for training, and
when there are two or more types of voice commands which comply with different syntaxes, respectively, said control means provides guidance on an operation of said vehicle-mounted control apparatus using a voice command according to one of said syntaxes to the user and receives input of a voice for training in said training mode two or more times while changing the voice command to achieve a target voice command for training,
wherein said control means displays advice information associated with results of analysis of the user's voice for training according to said operating guidance, and
wherein said voice recognition means compares a preset time length with a length of said voice for training, and said control means outputs, as said advice information, a display for urging the user to make a correction to a time required for the user to produce the voice based on a comparison result obtained by said voice recognition means when the length of said voice for training is longer than said preset time length.

2. The vehicle-mounted control apparatus according to claim 1, wherein said voice recognition means determines whether said voice for training is equal to or less than a threshold, and said control means outputs, as said advice information, a display for urging the user to increase a sound level of the voice which the user produces based on a determination result obtained by said voice recognition means.

3. The vehicle-mounted control apparatus according to claim 1, wherein said voice recognition means determines whether said voice for training has a sound which does not belong to said voice command, and, when said voice recognition means determines that said voice for training has a sound which does not belong to said voice command, said control means outputs, as said advice information, a display for urging the user to make a correction to the sound which does not belong to said voice command.

4. The vehicle-mounted control apparatus according to claim 1, wherein said voice recognition means determines whether said voice for training has been input at an earlier timing than what has been predetermined, and said control means outputs, as said advice information, a display for urging the user to make a correction to the timing at which the user produces the voice based on a determination result obtained by said voice recognition means.

5. The vehicle-mounted control apparatus according to claim 1, further comprising a selection button configured to perform switching between the command execution mode and the training mode.

6. A non-transitory computer readable storage medium having stored thereon computer executable program that causes a computer to execute a method of providing guidance on an operation of a vehicle-mounted control apparatus having a command execution mode in which said vehicle-mounted control apparatus executes a voice command recognized by a voice recognition means, and a training mode in which said vehicle-mounted control apparatus provides guidance on an operation of said vehicle-mounted control apparatus to a user so as to makes the user get training for operating said vehicle-mounted control apparatus, said program when executed causes the computer to execute the steps of:
providing guidance on an operation of said vehicle-mounted control apparatus, which is stored in a storage device, to a user in said training mode;

recording a voice for training which the user produces according to the guidance on the operation of said vehicle-mounted control apparatus, which is provided in the guidance providing step;

recognizing the user's voice based on the voice for training recorded in said recording step by means of a voice recognition means, and outputting results of analysis of the recognized voice to the user; and learning features of the user's voice based on the voice for training recorded in said recording step; and when there are two or more types of voice commands which comply with different syntaxes, respectively, said guidance providing step provides operating guidance of said vehicle-mounted control apparatus using a voice command according to one of said syntaxes to the user and receives input of a voice for training in said training mode two or more times while changing the voice command to achieve a target voice command for training, displaying advice information associated with results of analysis of the user's voice for training according to said operating guidance, and comparing a preset time length with a length of said voice for training, and outputting, as said advice information, a display for urging the user to make a correction to a time required for the user to produce the voice based on a comparison result obtained by said voice recognition means when the length of said voice for training is longer than said preset time length.

7. A method of providing guidance on an operation of a vehicle-mounted control apparatus having a command execution mode in which said vehicle-mounted control apparatus executes a voice command recognized by a voice recognition means, and a training mode in which said vehicle-mounted control apparatus provides guidance on an operation of said vehicle-mounted control apparatus to a user so as to makes the user get training for operating said vehicle-mounted control apparatus, comprising:

providing guidance on an operation of said vehicle-mounted control apparatus, which is stored in a storage device, to a user in said training mode;

recording a voice for training which the user produces according to the guidance on the operation of said vehicle-mounted control apparatus, which is provided in the guidance providing step;

recognizing the user's voice based on the voice for training recorded in said recording step by means of a voice recognition means, and outputting results of analysis of the recognized voice to the user;

learning features of the user's voice based on the voice for training recorded in said recording step; and when there are two or more types of voice commands which comply with different syntaxes, respectively, said guidance providing step provides guidance on an operation of said vehicle-mounted control apparatus using a voice command according to one of said syntaxes to the user and receives input of a voice for training in said training mode two or more times while changing the voice command to achieve a target voice command for training;

displaying advice information associated with results of analysis of the user's voice for training according to said operating guidance; and comparing a preset time length with a length of said voice for training, and outputting, as said advice information, a display for urging the user to make a correction to a time required for the user to produce the voice based on a comparison result obtained by said voice recognition means when the length of said voice for training is longer than said preset time length.

8. The non-transitory computer readable storage medium according to claim 6, wherein said program when executed causes the computer to further execute the step of switching between the command execution mode and the training mode.

9. The method according to claim 7 further comprising switching between the command execution mode and the training mode.

* * * * *